(12) United States Patent
Wang et al.

(10) Patent No.: US 7,034,065 B2
(45) Date of Patent: Apr. 25, 2006

(54) INK JET INK COMPOSITION

(75) Inventors: Jin-Shan Wang, Pittsford, NY (US); Huijuan Chen, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/957,558

(22) Filed: Sep. 20, 2001

(65) Prior Publication Data
US 2003/0092797 A1    May 15, 2003

(51) Int. Cl.
*C09D 11/10*    (2006.01)
*C08L 33/02*    (2006.01)
*C08L 37/00*    (2006.01)
*C08L 67/00*    (2006.01)
*C08L 77/00*    (2006.01)

(52) U.S. Cl. .................. 523/160; 524/556; 524/601; 524/606; 524/612; 528/272; 528/335; 528/421

(58) Field of Classification Search ............. 523/160, 523/161; 528/272, 274, 296, 335, 336, 421; 524/556, 601, 606, 548, 612
See application file for complete search history.

(56) References Cited

U.S. PATENT DOCUMENTS

| | | | | |
|---|---|---|---|---|
| 5,136,014 A | * | 8/1992 | Figuly .................... | 528/272 |
| 5,667,572 A | * | 9/1997 | Taniguchi et al. ....... | 106/31.36 |
| 5,693,129 A | * | 12/1997 | Lin ........................ | 106/31.43 |
| 5,889,083 A | * | 3/1999 | Zhu ........................ | 523/161 |
| 5,985,017 A | * | 11/1999 | Bugner et al. .......... | 106/31.75 |
| 6,031,022 A | | 2/2000 | Martin et al. | |
| 6,252,025 B1 | * | 6/2001 | Wang et al. ............. | 526/292.9 |
| 6,353,082 B1 | * | 3/2002 | Wang ...................... | 528/272 |
| 6,518,370 B1 | * | 2/2003 | Abuelyaman et al. ...... | 525/437 |
| 6,525,170 B1 | * | 2/2003 | Wang ...................... | 528/421 |
| 6,538,091 B1 | * | 3/2003 | Matyjaszewski et al. | 526/329.7 |
| 6,541,599 B1 | * | 4/2003 | Wang ...................... | 528/310 |
| 6,541,600 B1 | * | 4/2003 | Wang et al. ............. | 528/310 |
| 6,812,298 B1 | * | 11/2004 | Dvornic et al. ......... | 525/474 |
| 2003/0069370 A1 | * | 4/2003 | Dvornic et al. ......... | 525/474 |

FOREIGN PATENT DOCUMENTS

| | | |
|---|---|---|
| WO | 96/14346 | 5/1996 |
| WO | WO 00/37542 | 6/2000 |

OTHER PUBLICATIONS

Alger, Mark; Polymer Science Dictionary 2$^{nd}$ Edition, Chapman & Hall, London, 1989 (p. 407).*

* cited by examiner

*Primary Examiner*—Callie Shosho
(74) *Attorney, Agent, or Firm*—Kathleen Neuner Manne

(57) ABSTRACT

An ink jet ink composition comprising water, a pigment, a humectant and a hyperbranched polymer having end groups consisting essentially of hydrophilic moieties, said hyperbranched polymer having the following formula:

$$HB-X_g$$

wherein:
HB is a hyperbranched polymer core;
X is a hydrophilic end group; and
g is an integer of at least 2.

26 Claims, No Drawings

INK JET INK COMPOSITION

CROSS REFERENCE TO RELATED APPLICATIONS

Reference is made to commonly assigned, U.S. patent application Ser. Nos:

U.S. Ser. No. 09/956,729 by Chen et al., filed 20 Sep. 2001, entitled "Ink Jet Printing Method".

U.S. Ser. No. 09/957,558 by Wang at al., filed of even date herewith, entitled "ink Jet Ink Composition";

U.S. Ser. No. 09/957,548 by Chen et al., filed 20 Sep. 2001, entitled "Ink Jet Printing Method";

FIELD OF THE INVENTION

This invention relates to an ink jet ink composition comprising a pigment and a hyperbranched polymer having hydrophilic end groups.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is dissolved or dispersed in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

In traditional dye-based inks, no particles are observable under the microscope. Although there have been many recent advances in the art of dye-based ink jet inks, such inks still suffer from deficiencies such as low optical densities on plain paper and poor light-fastness. When water is used as the carrier, such inks also generally suffer from poor water fastness and poor smear resistance. These problems can be minimized by replacing the dyes used in ink formulations with insoluble pigments. In general, pigments are superior to dyes with respect to waterfastness. However, the pigment inks tend to be unstable and settle out from the liquid vehicle over a long storage time. In addition, some pigment based inks are not as stable as expected towards pollutant. Pigment inks also have a tendency to clog the orifices of the printhead resulting in deterioration of print quality.

Accordingly, there is a need for inks with good lightfastness, stability towards pollutants, waterfastness and reliability in the printhead.

WO 00/37542 discloses the use of dendritic polymers as a pigment dispersant in water-based ink jet inks. These dendritic polymers have at least one peripheral hydrophobic long chain hydrocarbon moiety and at least one ionizable moiety. However, there is a problem with this ink using such dendritic polymer as a dispersant in that the ink has a tendency to clog the nozzles of the printhead, It is an object of this invention to provide an ink jet ink composition that, when printed, provides an image which has improved waterfastness, lightfastness, and stability towards pollutants such as ozone. It is another object of the present invention to provide an ink jet ink composition that has improved firability through an ink jet printhead.

SUMMARY OF THE INVENTION

These and other objects are achieved in accordance with this invention which relates to an ink jet ink composition comprising water, a pigment, a humectant and a hyperbranched polymer having end groups consisting essentially of hydrophilic moieties, the hyperbranched polymer having the following formula:

$$HB\text{---}X_g$$

wherein:

HB is a hyperbranched polymer core;

X is a hydrophilic end group; and g is an integer of at least 2.

It has been found that this ink jet ink composition, when printed, provides an image which has improved waterfastness, lightfastness, print durability and stability towards pollutants such as ozone and has improved firability through an ink jet printhead.

DETAILED DESCRIPTION OF THE INVENTION

A hyperbranched polymer with various topologies and compositions may be used in the invention, e.g., homohyperbranched, random hyperbranched, block hyperbranched, graft hyperbranched, star hyperbranched, etc., provided it has the hydrophilic end groups as discussed above.

A hyperbranched polymer is defined as a polymer formed by polymerization of one or more branching monomers with or without no-branching monomers as described in J. Am. Chem. Soc., 74, p 2718 (1952), the disclosure of which is hereby incorporated by reference. The terms "hyperbranched" used herein with respect to branched polymers are intended to designate polymers having a relatively high percentage of propagated branching sites per number of polymerized monomer units, e.g., at least one branching site per every ten monomer units, preferably at least one branching site per every five monomer units, and more preferably, at least one branching site per every two monomer units.

In general, hyperbranched polymers used in the present invention can be made through a chain polymerization or condensation polymerization processes, as described in J. Polym. Sci., Part A: Polym. Chem. 36, 1685–1698 (1998) and U.S. Pat. No. 4,857,630, the disclosures of which are hereby incorporated by reference. Specifically, the hyperbranched polymer used in the present invention can be made through the polymerization of $A_n\text{---}R^1\text{---}B_m$ monomers, wherein n and m are integers of at least 1 and $R^1$ represents a linking group between A and B or co-polymerization of $A_s+B_t$ co-monomer pairs wherein s end t are integers of at least 2 and of at least 3, respectively, as described in U.S. Pat. No. 4,257,630, and co-pending Wang at al U.S. patent applications Nos. 09/697,205; 09/919,09; 09/919,390; and 09/919,097, filed Jul. 30, 2001, the disclosures of each of which are hereby incorporated by reference.

In a preferred embodiment, the hyperbranched polymer used in the invention is a polyamide, polyester, polyether, vinylic polymer, polyimine, polysiloxane, polyurethane, polythioether, polyarylalkylene, polysilane, or polyesteramide.

In another preferred embodiment of the invention, the hyperbranched polymer is prepared by a chain polymerization of a monomer of the formula $M^1{}_n$—$R^1$—$M^2{}_m$ wherein (i) $R^1$ is a substituted or non-substituted straight, cyclic or branched alkyl, alkenyl, or aryl moiety and hetero atom containing substituted or non-substituted straight, cyclic or branched alkyl, alkenyl, or aryl moiety; (ii), $M^1$ and $M^2$ are reactive groups that react independently of each other in which $M^1$ is a polymerization group and $M^2$ is a precursor of a moiety $M^{2*}$ which initiates the polymerization of $M^1$ as a result of being activated by any source; and (iii), n and m are integers of at least 1, more preferably n is 1 and m is 1 or 2, most preferably n is 1 and m is 1.

In another preferred embodiment of the invention, the hyperbranched polymer is prepared by a condensation or addition polymerization of a monomer of the formula $M^3{}_s$—$R^1$—$M^4{}_t$ wherein (i) $R^1$ is defined above; (ii), $M^3$ and $M^4$ are groups that undergo a condensation or addition reaction with or without a catalyst; and (iii), s is an integer of at least 1 and t at least 2, more preferably s is 1 and t is 2 to 4, and most preferably s is 1 and t is 2.

In another preferred embodiment of the invention, hyperbranched polymer is prepared by a condensation or addition polymerization of a co-monomer pair of the formula $R_2$—$M^5{}_x$ and $R^3$—$M^6{}_y$ wherein (i) $R^2$ and $R^3$ are each dependently substituted or non-substituted straight, cyclic or branched alkyl, alkenyl, or aryl moiety or hetero atom containing substituted or non-substituted straight, cyclic or branched alkyl, alkenyl, or aryl moiety; (ii), $M^5$ and $M^6$ are groups that undergo a condensation or addition reaction; and (iii), x is an integer of at least 2 and y an integer of at least 3, more preferably x is 2 and 4 and y is 3 to 10, and most preferably x is 2 and y is 3.

In another preferred embodiment of the invention,
$M^1$ is a non-substituted or substituted vinylic group or epoxy; and
$M^2$ is X, —$CH_2X$, —$CH(CH_3)X$, —$C(O)CH_2X$, —$C(O)CHX_2$, —$C(O)CX_3$, —$OC(O)CH_2X$, —$OC(O)CHX_2$, or —$OC(O)CX_3$ wherein:
X is Cl, Br, I, S—C(=S)—$NR^4R^5$, S—C(=S)—$OR^4$, —O—$NR^4R^5$, OH or

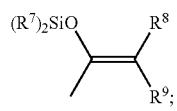

wherein $R^4$ and $R^5$ are each independently —$(CH_2)_r$, —$C_6H_5$, —C(O)O or —C(O);
$R^7$, $R^8$ and $R^9$ are each independently a linear or branched alkyl or aromatic group; and
r=1–12.

In another preferred embodiment of the invention, $M^3$ and $M^4$ are each independently —COOH, —OH, —C(O)Cl,

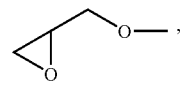

anhydride, NH, or $NH_2$.

In another preferred embodiment of the invention,
$M^5$ and $M^6$ are each independently —COOH, —OH, —C(O)Cl, epoxy, anhydride, —NH, —$NH_2$ or

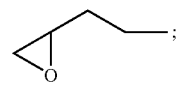

$R^2$ is —$C_6H_3$— or —$(CH_2)_q$—$C(R^6)$—,
wherein $R^6$ is a linear or branched alkyl or aromatic group and q is 1–6; and
$R^3$ is —$C_6H_4$—, —$C_6H_4$—O—$C_6H_4$—, —$C_6H_3$, —$N(CH_2)_3$, —$C_4H_8$—, —$C_6H_{10}$—,

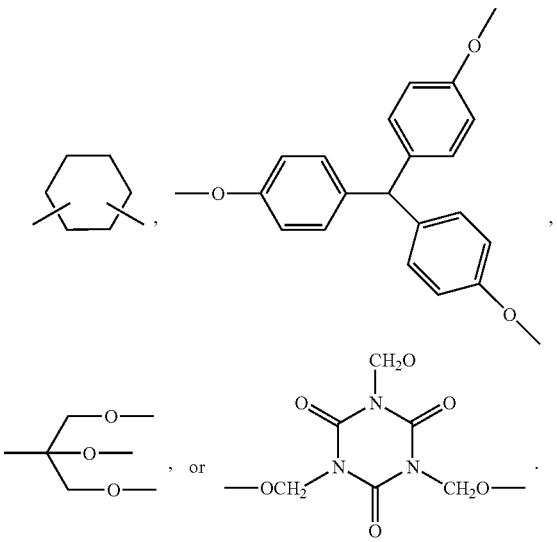

In still another embodiment of the invention, $R^1$, $R^2$, and $R^3$ are each independently an oligomeric or polymeric chain of a polyamide, polyester, polyether, vinylic polymer, polyimine, polysiloxane, polyurethane, polythioether, polyarylalkylene, polysilane, or polyesteramide.

Examples of $M^1$—$R^1$—$M^2{}_m$ include:

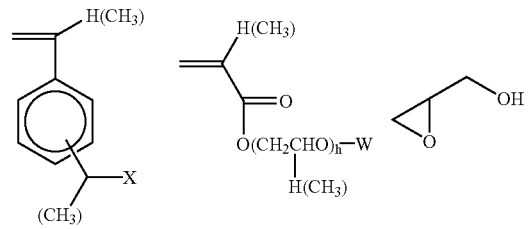

wherein h is an integer of at least 1;

W is —C(O)CH$_2$X, —C(O)CHX$_2$ or —C(O)CX$_3$; and

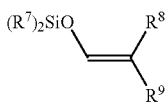

X is Cl, Br, I,
S—C(=S)—OR$^4$, S—C(=S)—
NR$^4$R$^5$ or O—NR$^4$R$^5$, where R$^4$ and R$^5$ are defined as above,
and R$^7$, R$^8$ and R$^9$ are each independently a linear or branched alkyl or aromatic group.

Examples of M$^3_s$—R$^2$—M$^4_t$ include 2,2-bis(hydroxymethyl)propionic acid, 2,3-diaminoproponic acid, 2,5-diaminopentanoic acid, 1-Lysine and other ones having the following structure:

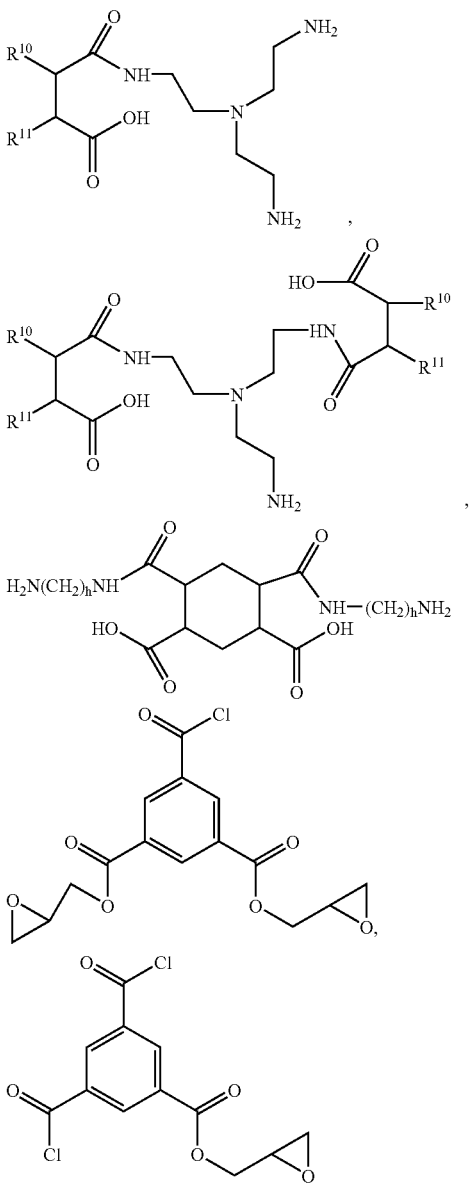

wherein R$^{10}$ and R$^{11}$ are independently H, substituted or non-substituted straight or branched alkyl, alkenyl, aryl moiety and may be joined to form an alkylene group, 3 to 8-membered ring, h is defined above.

Examples of R$^2$—M$^5_x$ and R$^3$—M$^6_y$ include Jeffamines, diaminohexane, 3,3'-diamino-N-methylpropylamine, 1,4-phenylenediamine, 4,4'-oxydianiline, succinic acid, adipic acid, 1,4-cyclohexanedicarboxilic acid, terephthalic acid, 4,4'-oxybis(benzoic acid), 2-aminoterephtalic acid, tris(2-aminoethyl)amine, trimesic acid, maleic anhydride, succinic anhydride, hexahydrophthalic anhydride, phthalic anhydride, glutaric anhydride, octenyl anhydride, decanyl anhydride, 2-dodecenyl-1-ylsuccinic anhydride, octen-1-ylsuccinic anhydride, 1,2,3,4-cyclopentane-tetra-carboxylic dianhydride, diethanolamine, diisopropanolamine, 1,2,7,8-diepoxyoctane, 1,1,1-tris(hydroxylmethyl)ethane, triethanolamine, diglycidyl-1,2-cyclohexanedicaboxylate, diglycidyl-1,2,3,6-tetrahydrophtalate, poly(propyleneglycol) diglycidyl ether, poly(dimethylsioxane) diglycidyl ether, bisphenol A propoxylate (1PO/phenol) diglycidyl ether, bis(4-glycidyloxyphenyl)methane, resorcinol diglycidyl ether, diglycidyl aniline, triphenylolmethane tridiglycidyl ether, trimethylolpropane tridiglycidyl ether, N,N-diglycidyl-4-glycidyloxybenzene, tris-2(2,3-epoxypropyl)isocyanurate, terephthaloyl chloride, 1,3,5-benzenetricarbonyl trichloride, aminopropyl terminated polydimethylsiloxanes with molecular weight from 800 to 300,000, and aminopropyl methylsiloxane-dimethylsiloxane copolymers with molecular weight from 4,000 to 5,000 and molar percentage of aminopropyl methylsiloxane from 2to 7.

In a preferred embodiment of the invention, the hyperbranched polymer with hydrophilic end groups is itself either water soluble or dispersible. In another embodiment, the hydrophilic end groups are cationic, anionic, non-charged, or a mixture thereof In still another preferred embodiment, the anionic groups comprise a carboxylic acid or its salt, a sulfonic acid or its salt, a phosphonic acid or its salt, or a polymer chain containing said acid or its salt. In still yet another preferred embodiment, the cationic groups comprise a N- or P- containing quaternized onium salt or a polymer chain containing said onium salt. In still another preferred embodiment, the non-charged groups are each independently OH, ether, NH$_2$, imidazole, acrylamide, oligomeric or polymeric oxazoline, oligomeric or poly-tetrahydrofuran, oligomeric or polymeric ether, oligomeric or polymeric amine, oligomeric or polymeric vinyl alcohol, or oligomeric or polymeric acrylamide.

The above-described hydrophilic end groups can be introduced by either direct polymerization of monomers having those groups or by post-modification of the hyperbranched polymer via known chemical reactions.

Examples of hyperbranched polymers having hydrophilic end groups useful in the invention include a hyperbranched polyamide with both amine and carboxylic acid-end groups, a hyperbranched polyamide with carboxylic acid-end groups, a hyperbranched polyamide with amine-end groups, a hyperbranched polyamide with quaternized end groups, a hyperbranched aliphatic polyester with hydroxy end groups, a hyperbranched aliphatic polyester with carboxylic acid-end groups, a hyperbranched aliphatic polyester with combined hydroxy and carboxylic acid-end groups, a hyperbranched aromatic polyester with carboxylic acid-end groups, a hyperbranched aromatic polyester with sulfonic acid-end groups, a hyperbranched polyether with hydroxy end groups, a hyperbranched quaternized poly(chloromethyl)styrene, a hyperbranched poly(vinyl benzene sulfonyl chloride) with sulfonic acid end groups, a hyperbranched polyesteramide with hydroxy end groups, a hyperbranched polyesteramide with carboxylic acid end groups, a hyperbranched polyesteramide with combined hydroxy and carboxylic acid end groups, a hyperbranched polyesteramide with quaternized end groups, or a hyperbranched polyesteramide with combined hydroxy and quaternized end groups.

In another preferred embodiment of the invention, the hyperbranched polymer having hydrophilic end groups can be added as an additive together with a pigment dispersion to prepare the ink.

In another preferred embodiment of the invention, the hyperbranched polymer having hydrophilic end groups can be used as a dispersant to disperse the pigment particles used in ink jet inks. It can be used alone or in conjunction with another dispersant as primary or secondary dispersant.

The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a preferred embodiment, the grinding media can comprise particles, preferably substantially spherical in shape, e.g., beads, consisting essentially of a polymeric resin. In general, polymeric resins suitable for use as milling media are chemically and physically inert, substantially free of metals, solvent and monomers, and of sufficient hardness and firability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin®, vinyl chloride polymers and copolymers, polyurethanes, polyamides, poly(tetrafluoroethylenes), e.g., Teflon®, and other fluoropolymers, high density polyethylenes, polypropylenes, cellulose ethers and esters such as cellulose acetate, poly(hydroxyethylmethacrylate), poly(hydroxyethylacrylate), silicone containing polymers such as polysiloxanes and the like. The polymer can be biodegradable. Exemplary biodegradable polymers include poly(lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm3. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an air jet mill, a roller mill, a ball mill, an attritor mill and a bead mill. A high speed mill is preferred. By high speed mill we mean milling devices capable of accelerating milling media to velocities greater than about 5 meters per second. Sufficient milling media velocity is achieved, for example, in Cowles-type saw tooth impeller having a diameter of 40 mm when operated at 9,000 rpm. The preferred proportions of the milling media, the pigment, the liquid dispersion medium and dispersant can vary within wide limits and depends, for example, up on the particular material selected and the size and density of the milling media etc. After milling is complete, the dispersion of active material is separated from the grinding media by simple sieving or filtration. With either of the above modes the preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media The weight ratio of pigment to dispersant is 20:1 to 1:2. The high speed mill is a high agitation device, such as those manufactured by Morehouse-Cowles, Hockmeyer et al.

The dispersant is another important ingredient in the mill grind. Preferred dispersants used in conjunction with the hyperbranched polymers having hydrophilic end groups in the invention include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of dispersant to select from. The co-dispersant used in the examples is potassium N-methyl-N-oleoyl taurate (K-OMT).

The milling time can vary widely and depends upon the pigment, mechanical means and residence conditions selected, the initial and desired final particle size, etc. For aqueous mill grinds using the preferred pigments, dispersants, and milling media described above, milling times will typically range from 1 to 100 hours. The milled pigment concentrate is preferably separated from the milling media by filtration.

The pigment particles useful in the invention may have any particle size which can be jetted through a print head. Preferably, the pigment particles have a mean particle size of less than about 200 nm, more preferably less than about 80 nm.

A wide variety of organic and inorganic pigments, alone or in combination, may be selected for use in the present invention. Colorant particles which may be used in the invention include pigments as disclosed, for example in U.S. Pat. Nos. 5,026,427; 5,086,698; 5,141,556; 5,160,370; and 5,169,436, the disclosures of which are hereby incorporated by reference. The exact choice of pigments will depend upon the specific application and performance requirements such as color reproduction and image stability. Pigments suitable for use in the present invention include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include Color Index (C.I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C.I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Violet 1, 2, 3, 5:1, 13, 19, 23, 25, 27, 29, 31, 32, 37, 39, 42, 44, 50; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C.I. Pigment Green 1, 2, 4, 7, 8, 10, 36, 45; C.I. Pigment Black 1, 7, 20, 31, 32, and C.I. Pigment Brown 1, 5, 22, 23, 25, 38, 41, 42. In a preferred embodiment of the invention, the pigments are bridged aluminum phthalocyanines as described in U.S. Pat. No. 4,311,775, the contents of which are incorporated herein by reference.

The pigment used in the invention is present in the ink jet ink in any effective amount, generally from about 0.1 to about 10% by weight, and preferably from about 0.5% to about 6% by weight.

The hyperbranched polymer used in the invention is present in the ink jet ink generally from about 0.1% to about 30% by weight, and preferably from about 0.5% to about 10% by weight.

A humectant is employed in the ink jet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidizolidinone; and sulfur-containing compounds such as dimethyl sulfoxide and tetramethylene sulfone. A preferred humectant for the composition of the invention is diethylene glycol, glycerol, or diethylene glycol monobutylether.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition of the invention to suppress the growth of microorganisms such as molds, fungi, etc. in aqueous inks. A preferred biocide for the ink composition of the present invention is Proxel® GXL (Zeneca Specialties Co.) at a final concentration of 0.0001–0.5 wt. %.

The pH of the aqueous ink compositions of the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition of the invention may comprise, for example, the following substituents by weight: hyperbranched polymer (0.2–20%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition of the invention include thickeners, conductivity enhancing agents, anti-kogation agents, drying agents, and defoamers.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following example illustrates the utility of the present invention.

EXAMPLES

The following hyperbranched polymers having hydrophilic end groups were used in the present invention:

Hyperbranched Polymer 1 (HB-1):

Hyperbranched polyamide with amine and acid end groups was prepared by high temperature polymerization of tris(2-aminoethyl)amine (2 molar equiv.) and succinic acid (1 molar equiv.) in water according to the process described in copending application U.S. Pat. No. 09/919,097 filed Jul. 30, 2001. The Tg of the polymer is ca. 54° C.

Hyperbranched Polymer 1 (HB-2):

Hyperbranched polyamide with amine and acid end groups was prepared by high temperature polymerization of tris(2-aminoethyl)amine (2 molar equiv.) and 1,4-cyclohexanedicarboxylic acid (1 molar equiv.) in water according to the process described in copending application U.S. Pat. No. 09/919,997, filed Jul. 30, 2001. The Tg of the polymer is ca. 65° C.

Hyperbranched Polymer 3 (HB-3):

Bolton® H20, a hyperbranched polyester with OH end groups obtained from Perstorp, Inc. The molecular weight of the polymer is 2100.

Hyperbranched Polymer 4 (HB-4):

Hybrane® P/S80 1200, a hyperbranched polyesteramide with COOH end groups obtained from DSM Corp. The molecular weight of the polymer is 1200.

Preparation of Pigment Dispersions

Comparative Pigment Dispersion (No Hyperbranched Polymer)

8.0 g of bridged aluminum phthalocyanine solid pigment was added to a jar together with 5 g of potassium N-methyl-N-oleoyl taurate (K-OMT), 36.0 g of water, and 25.0 g of 50 micron polystyrene beads as milling media. The jar was covered and the mixture was milled for 6 days by means of ball milling technique using a US Stonewave Roller Mill. Additional 30.0 g of deionized water was added to the milling mixture. The dispersion was separated from the milling media by filtering the millgrind through a 4–8 µm KIMAX® Buchner Funnel obtained from VWR Scientific Products. The pigment was about 10.0% by weight of the total final dispersion. The pigment particle size was not visible by an optical microscope.

Pigment Dispersion 1 of the Invention

The pigment dispersion 1 of the invention was prepared similar to the Comparative Pigment Dispersion except that 8.0 g of hyperbranched polymer HB-1 was added to the milling mixture in addition to the other components. The pigment was about 9.8% by weight of the total final dispersion.

Pigment Dispersion 2 of the Invention

The pigment dispersion 2 of the present invention was prepared similar to the Pigment Dispersion 1 except that hyperbranched polymer HB-3 was used instead of hyperbranched polymer HB-1. The pigment was about 10.4% by weight of the total final dispersion.

Pigment Dispersion 3 of the Invention

The pigment dispersion 3 of the invention was prepared similar to the Pigment Dispersion 1 except that hyperbranched polymer HB-4 was used instead of hyperbranched polymer HB-1. The pigment was about 8.1% by weight of the total final dispersion.

Comparative Ink C-1 (No Polymer)

To prepare the comparative ink jet ink (C-1), 2.2 g of the Control Pigment Dispersion (10% active), 0.05 g Surfynol® 465 (Air Products Inc.), 0.6 g diethylene glycol and 0.3 g di(propyleneglycol) methyl ether (Dowanol® DPM) were added together with distilled water so that the final weight of the ink was 10.0 g. The final ink contained 2.2% bridged aluminum phthalocyanine pigment, 0.50% Surfynol® 465, 6.0% diethylene glycol and 3% di(propyleneglycol) methyl ether. The solution was filtered through a 3 µm polytetrafluoroethylene filter and filled into an empty Lexmark Z51 ink jet cartridge.

Comparative Ink C-2 (Linear Polyester as Additive)

This ink was prepared similar to Comparative Ink C-1 except that a linear, water dispersible polyester AQ55® from Eastman Chemical Co. was also used in addition to the Control Pigment Dispersion. To prepare this ink, 0.83 g of AQ55® (30% active), 2.2 g of the Control Pigment Dispersion(10% active), 0.05 g Surfynol® 465 (Air Products Inc.), 0.6 g diethylene glycol and 0.3 g di(propyleneglycol) methyl ether (Dowanol® DPM) were added together with distilled water so that the final weight of the ink was 10.0 g. The final ink contained 2.5% AQ55®, 2.2% bridged aluminum phthalocyanine pigment, 0.50% Surfynol® 465, 6.0% diethylene glycol and 3% di(propyleneglycol) methyl ether. The solution was filtered through a 3 µm polytetrafluoroethylene filter and filled into an LexmarkZ51 ink jet cartridge.

Ink 1 of the Invention (Hyperbranched Polymer HB-1 as Additive)

This ink was prepared similar to the Comparative Ink C-2 except that the hyperbranched polymer HB-1 was used instead of polyester AQ55®.

Ink 2 of the Invention (Hyperbranched Polymer HB-2 as Additive)

This ink was prepared similar to Ink 1 of the invention except that the hyperbranched polymer HB-2 was used instead of the hyperbranched polymer HB-1.

Ink 3 of the Invention (Hyperbranched Polymer HB-3 as Additive)

This ink was prepared similar to Ink 1 of the invention except that the hyperbranched polymer HB-3 was used instead of the hyperbranched polymer HB-1.

Ink 4 of the Invention (Hyperbranched Polymer HB-4 as Additive)

This ink was prepared similar to Ink 1 of the invention except that the hyperbranched polymer HB-4 was used instead of the hyperbranched polymer HB-1.

Ink 5 of the Invention (Hyperbranched Polymer HB-1 as Co-Dispersant)

This ink was prepared similar to the Comparative Ink C-1 except that the Pigment Dispersion 1 of the Invention was used instead of the Comparative Pigment Dispersion.

Ink 6 of the Invention (Hyperbranched Polymer HB-3 as Co-Dispersant)

This ink was prepared similar to Ink 5 of the Invention except that the Pigment Dispersion 2 of the Invention was used instead of the Pigment Dispersion 1 of the Invention.

Ink 7 of the Invention (Hyperbranched Polymer HB-4 as Co-Dispersant)

This ink was prepared similar to Ink 5 of the Invention except that the Pigment Dispersion 3 of the Invention was used instead of the Pigment Dispersion 1 of the Invention.

Printing

Elements were prepared using test images consisting of a series of 6 variable density patches, approximately 15 by 13 mm in size, ranging from 5% dot coverage to 100% dot coverage printed onto commercially available Epson Premium Glossy Paper, Cat. No SO41286, with a Lexmark Z51 Thermal ink jet printer, using the above inks. The elements were allowed to dry for 24 hours at ambient temperature and humidity. Inks without defects such as banding when printed was considered "good" in firability, inks could not be fired out of print head or the print had very low print density was considered "poor" in firability. The results are shown in Table 1.

Stability Tests

The above elements were then placed in an ozone chamber (~5 ppm ozone level, 50% relative humidity) for 48 hours. The Status A reflection densities of the maximum density patch of the elements were measured using an X-Rite® 414 densitometer before and after the ozone fade test. The percentages of the Status A densities retained for the 100% dot coverage patches were calculated and are also listed in Table 1.

TABLE 1

| Ink | Ozone Test (% Retained) | Firability |
|---|---|---|
| C-1 | 54 | good |
| C-2 | — | poor |
| 1 | 65 | good |
| 2 | 82 | good |
| 3 | 81 | good |
| 4 | 79 | good |
| 5 | 100 | good |
| 6 | 91 | good |
| 7 | 92 | good |

The above results show that the elements of the invention had improved ozone stability and firability as compared to the control elements.

The invention has been described in detail with particular reference to certain preferred embodiments thereof, but it will be understood that variations and modifications can be effected within the spirit and scope of the invention.

Ink 6 of the Invention (Hyperbranched Polymer HB-3 as Co-Dispersant)

This ink was prepared similar to Ink 5 of the Invention except that the Pigment Dispersion 2 of the Invention was used instead of the Pigment Dispersion 1 of the Invention.

Ink 7 of the Invention (Hyperbranched Polymer HB-4 as Co-Dispersant)

This ink was prepared similar to Ink 5 of the Invention except that the Pigment Dispersion 3 of the Invention was used instead of the Pigment Dispersion 1 of the Invention.

Printing

Elements were prepared using test images consisting of a series of 6 variable density patches, approximately 15 by 13 mm in size, ranging from 5% dot coverage to 100% dot coverage printed onto commercially available Epson Premium Glossy Paper, Cat. No SO41286, with a Lexmark Z51 Thermal ink jet printer, using the above inks. The elements were allowed to dry for 24 hours at ambient temperature and humidity. Inks without defects such as banding when printed was considered "good" in firability, inks could not be fired out of print head or the print had very low print density was considered "poor" in firability. The results are shown in Table 1.

Stability Tests

The above elements were then placed in an ozone chamber (~5 ppm ozone level, 50% relative humidity) for 48 hours. The Status A reflection densities of the maximum density patch of the elements were measured using an X-Rite® 414 densitometer before and after the ozone fade test. The percentages of the Status A densities retained for the 100% dot coverage patches were calculated and are also listed in Table 1.

TABLE 1

| Ink | Ozone Test (% Retained) | Firability |
|---|---|---|
| C-1 | 54 | good |
| C-2 | — | poor |
| 1 | 65 | good |
| 2 | 82 | good |
| 3 | 81 | good |
| 4 | 79 | good |
| 5 | 100 | good |
| 6 | 91 | good |
| 7 | 92 | good |

The above results show that the elements of the invention had improved ozone stability and firability as compared to the control elements.

The invention has been described in detail with particular reference to certain preferred embodiments thereof, but it will be understood that variations and modifications can be effected within the spirit and scope of the invention.

What is claimed is:

1. An ink jet ink composition comprising water, a dispersed pigment, a humectant and a hyperbranched polymer having end groups consisting essentially of hydrophilic moieties, said hyperbranched polymer having the following formula:

$$HB-X_g$$ 

wherein:

HB is a hyperbranched polymer core;

X is a hydrophilic end group; and g is an integer of at least 2, wherein said hyperbranched polymer is a chain polymerized residue of a monomer of the formula $M^1_n-R^1-M^2_m$ wherein (i) $R^1$ is a substituted or non-substituted straight, cyclic or branched alkyl, alkenyl, or aryl moiety or hetero atom containing substituted or non-substituted straight, cyclic or branched alkyl, alkenyl, or aryl moiety; (ii), $M^1$ and $M^2$ are reactive groups that react independently of each other in which $M^1$ is a polymerization group and $M^2$ is a precursor of a moiety $M^{2*}$ which initiates the polymerization of $M^1$ as a result of being activated by any source; and (iii), n and m are integers of at least 1.

2. The composition of claim 1 wherein said hyperbranched polymer is water-soluble or water-dispersible.

3. The composition of claim 1 wherein said pigment is an azo pigment, a monoazo pigment, a disazo pigment, an azo pigment lake, a β-Naphthol pigment, a Naphthol AS pigment, a benzimidazolone pigment, a disazo condensation pigment, a metal complex pigment, an isoindolinone pigment isoindoline pigment, a polycyclic pigment, a phthalocyanine pigment, a quinacridone pigment, a perylene pigment perinone pigment, a thioindigo pigment, an anthrapyrimidone pigment, a flavanthrone pigment, an anthanthrone pigment, a dioxazine pigment, a triarylcarbonium pigment, a quinophthalone pigment, a diketopyrrolo pyrrole pigment, titanium oxide, iron oxide or carbon black.

4. The composition of claim 1 wherein said pigment is a bridged aluminum phthalocyanine.

5. The composition of claim 1 wherein:

$M^1$ is a non-substituted or substituted vinylic group or epoxy; and $M^2$ is X, $-CH_2X$, $-CH(CH_3)X$, $-C(O)CH_2X$, $-C(O)CHX_2$, $-C(O)CX_3$, $-OC(O)CH_2X$, $-OC(O)CHX_2$, or $-OC(O)CX_3$ wherein:

X is Cl, Br, I, $S-C(=S)-NR^4R^5$, $S-C(=S)-OR^4$, $-O-NR^4R^5$, OH or

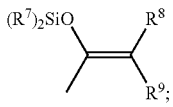

wherein $R^4$ and $R^5$ are each independently —$(CH_2)_r$, —$C_6H_5$, —C(O)O or —C(O);
$R^7$, $R^8$ and $R^9$ are each independently a linear or branched alkyl or aromatic group; and
r=1–12.

6. The composition of claim 1 wherein said $M^1{}_n$—$R^1$—$M^2{}_m$ is:

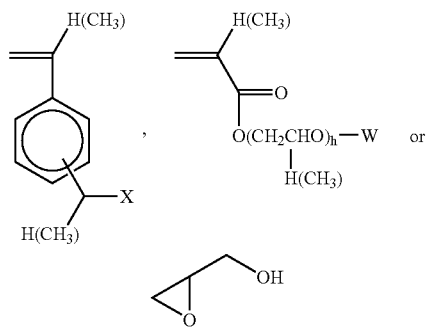

wherein h is an integer of at least 1;
W is —C(O)CH$_2$X, —C(O)CHX$_2$—C(O)CX$_3$, or

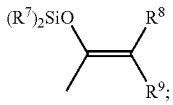

X is Cl, Br, I, S—C(=S)—OR$^4$, S—C(=S)—NR$^4$R$^5$ or O—NR$^4$R$^5$, where R$^4$ and R$^5$ are each independently —(CH$_2$)$_r$, —C$_6$H$_5$, —C(O)O or —C(O), wherein r is 1–12; and
R$^7$, R$^8$ and R$^9$ are each independently a linear or branched alkyl or aromatic group.

7. The composition of claim 1 wherein said humectant is diethylene glycol, glycerol, diethylene glycol monobutylether or dipropyleneglycol methyl ether.

8. The composition of claim 1 wherein said hyperbranched polymer comprises about 0.1 to about 30% by weight of said ink jet ink composition.

9. The composition of claim 1, wherein the dispersed pigment is dispersed with a dispersant.

10. The composition of claim 9, wherein the dispersant includes one or more of sodium dodecyl sulfate, an acrylic copolymer, a styrene-acrylic copolymer, a sulfonated polyester, a sulfonated styrene, or N-methyl-N-oleoyl taurate.

11. The composition of claim 9, wherein the ratio of pigment to dispersant is 20:1 to 1:2.

12. The composition of claim 1, wherein the dispersed pigment has a particle size of less than 200 nm.

13. The composition of claim 1, wherein the dispersed pigment has a particle size of less than 80 nm.

14. An ink jet ink composition comprising water, a dispersed pigment, a humectant and a hyperbranched polymer having end groups consisting essentially of hydrophilic moieties, said hyperbranched polymer having the following formula:

HB—X$_g$ wherein:
HB is a hyperbranched polymer core;
X is a hydrophilic end group; and
g is an integer of at least 2,
wherein said hyperbranched polymer is an addition polymerization product of a monomer of the formula M$^3{}_s$—R$^1$—M$^4{}_t$, wherein (i) R$^1$ is a substituted or non-substituted straight, cyclic or branched alkyl, alkenyl, or aryl moiety, or heteroatoms-containing substituted or non-substituted straight, cyclic or branched alkyl, alkenyl, or aryl moiety; (ii), M$^3$ and M$^4$ are groups that undergo an addition reaction with or without a catalyst; and (iii), s is an integer of at least 1 and t at least 2.

15. An ink jet ink composition comprising water, a dispersed pigment, a humectant and a hyperbranched polymer having end groups consisting essentially of hydrophilic moieties, said hyperbranched polymer having the following formula:

HB—X$_g$ wherein:
HB is a hyperbranched polymer core;
X is a hydrophilic end group; and
g is an integer of at least 2,
wherein said hyperbranched polymer is a condensation or an addition polymerization product of a monomer of the formula M$^3{}_s$—R$^1$—M$^4{}_t$, wherein (i) R$^1$ is a substituted or non-substituted straight, cyclic or branched alkyl, alkenyl, or aryl moiety or heteroatoms-containing substituted or non-substituted straight, cyclic or branched alkyl, alkenyl, or aryl moiety; (ii), M$^3$ and M$^4$ are groups that undergo a condensation or an addition reaction with or without a catalyst, wherein M$^3$ and M$^4$ are each independently —C(O)Cl,

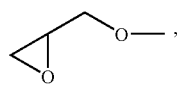

anhydride, —NH, or —NH$_2$; and (iii), s is an integer of at least 1 and t at least 2.

16. An ink jet ink composition comprising water, a dispersed pigment, a humectant and a hyperbranched polymer having end groups consisting essentially of hydrophilic moieties, said hyperbranched polymer having the following formula:

HB—X$_g$ wherein:
HB is a hyperbranched polymer core;
X is a hydrophilic end group; and
g is an integer of at least 2,
wherein said hyperbranched polymer is a chain polymerized residue of a monomer of the formula M$^2{}_n$—R$^1$—M$^2{}_m$ wherein (i) R$^1$ is an oligomeric or polymeric chain of a polyamide, polyester, polyether, vinylic polymer, polyimine, polysiloxane, polyurethane, polythioether, polyarylalkylene, polysilane, or polyesteramide; (ii), M$^1$ and M$^2$ are reactive groups that react independently of each other in which M$^1$ is a polymerization group and M$^2$ is a precursor of a moiety M$^{2*}$ which initiates the polymerization of $M^1$ as a result of being activated by any source; and (iii), n and m integers of at least 1.

17. An ink jet ink composition comprising water, a dispersed pigment, a humectant and a hyperbranched polymer having end groups consisting essentially of hydrophilic moieties, said hyperbranched polymer having the following formula:

$$HB-X_g$$

wherein:
HB is a hyperbranched polymer core;
X is a hydrophilic end group; and
g is an integer of at least 2,
wherein said hyperbranched polymer is a condensation or addition polymerization product of a co-monomer pair of the formula $R^2-M^5_x$ and $R^3-M^6_y$, wherein (i) $R^2$, and $R^3$ are each independently an oligomeric or polymeric chain of a polyamide, polyester, polyether, vinylic polymer, polyimine, polysiloxane, polyurethane, polythioether, polyarylalkylene, polysilane, or polyesteramide; (ii), $M^5$ and $M^6$ are groups that undergo a condensation or addition reaction; and (iii), x is an integer of at least 2 and y an integer of at least 3.

18. An ink jet ink composition comprising water, a dispersed pigment, a humectant and a hyperbranched polymer having end groups consisting essentially of hydrophilic moieties, said hyperbranched polymer having the following formula:

$$HB-X_g$$

wherein:
HB is a hyperbranched polymer core;
X is a hydrophilic end group; and
g is an integer of at least 2,
wherein said hyperbranched polymer is an addition polymerization product of a monomer of the formula $M^3_s-R^1-M^4_t$ wherein said $M^3_s-R^1-M^4_t$ is 2,2-bis(hydroxymethyl)propionic acid, 2,3-diaminoproponic acid, 2,5-diaminopentanoic acid, 1-Lysine, or has one of the following structures:

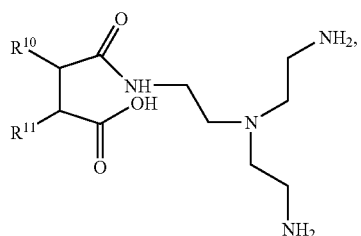

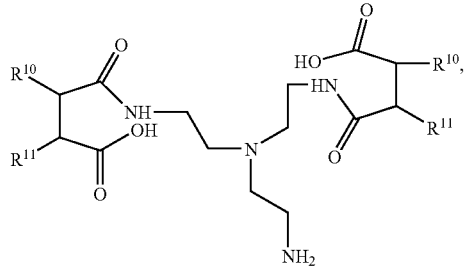

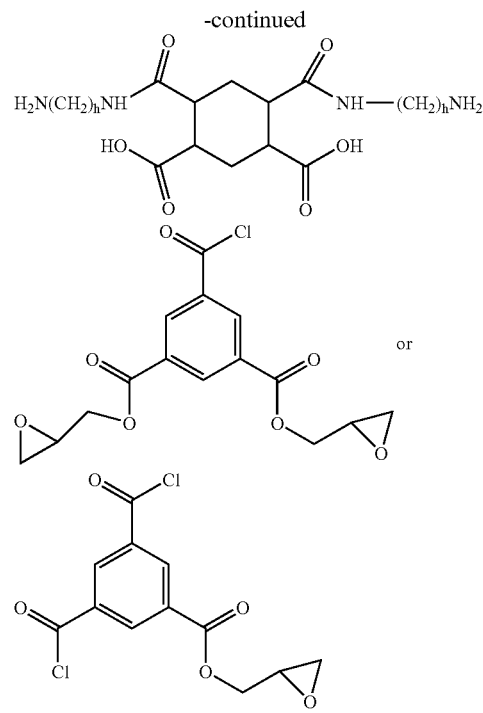

wherein $R^{10}$ and $R^{11}$ are independently H, substituted or non-substituted straight or branched alkyl, alkenyl, or aryl moiety, or may be joined to form an alkylene group, or 3 to 8-membered ring; and
h is an integer of at least 1.

19. An ink jet ink composition comprising water, a dispersed pigment, a humectant and a hyperbranched polymer having end groups consisting essentially of hydrophilic moieties, said hyperbranched polymer having the following formula:

$$HB-X_g$$

wherein:
HB is a hyperbranched polymer core;
X is a hydrophilic end group; and
g is an integer of at least 2,
wherein said hydrophilic end groups are cationic, and wherein said cationic groups comprise a N- or P-containing quaternized onium salt or a polymer chain containing said onium salt.

20. An ink jet ink composition comprising water, a pigment, a humectant and a hyperbranched polymer having end groups consisting essentially of hydrophilic moieties, said hyperbranched polymer having the following formula:

$$HB-X_g$$

wherein:
HB is a hyperbranched polymer core;
X is a hydrophilic end group; and
g is an integer of at least 2,
wherein said hyperbranched polymer is a chain polymerized residue of a monomer of the formula $M^1_n-R^1-M^2_m$ wherein (i) $R^1$ is a substituted or non-substituted straight, cyclic or branched alkyl, alkenyl, or aryl moiety or hetero atom containing substituted or non-substituted straight, cyclic or branched alkyl, alkenyl, or aryl moiety; (ii), $M^1$ and $M^2$ are reactive groups that react independently of each other in which $M^1$ is a polymerization group and $M^2$ is a precursor of a moiety $M^{2*}$ which initiates the polymerization of $M^1$ as a result of being activated by any source; and (iii), n and m are integers of at least 1.

21. The composition of claim 20 wherein:
$M^1$ is a non-substituted or substituted vinylic group or epoxy; and
$M^2$ is X, —$CH_2X$, —$CH(CH_3)X$, —$C(O)CH_2X$, —$C(O)CHX_2$, —$C(O)CX_3$, —$OC(O)CH_2X$, —$OC(O)CHX_2$, or —$OC(O)CX_3$ wherein:
X is Cl, Br, I, S—C(=S)—$NR^4R^5$, S—C(=S)—$OR^4$, —O—$NR^4R^5$, OH or

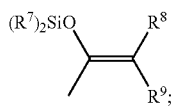

wherein $R^4$ and $R^5$ are each independently —$(CH_2)_r$, —$C_6H_5$, —C(O)O or —(C(O));
$R^7$, $R^8$ and $R^9$ are each independently a linear or branched alkyl or aromatic group; and
r=1–12.

22. The composition of claim 20 wherein said $M^1_n$—$R^1$—$M^2_m$ is:

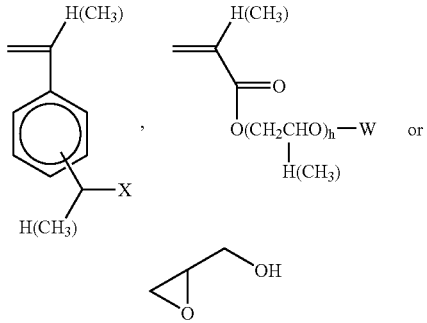

wherein h is an integer of at least 1;
W is —$C(O)CH_2X$, —$C(O)CHX_2$—$C(O)CX_3$, or

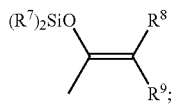

X is Cl, Br, I, S—C(=S)—$OR^4$, S—C(=S)—$NR^4R^5$ or O—$NR^4R^5$, where $R^4$ and $R^5$ are each independently —$(CH_2)_r$, —$C_6H_5$, —C(O)O or —(C(O)), wherein r is 1–12; and $R^7$, $R^8$ and $R^9$ are each independently a linear or branched alkyl or aromatic group.

23. An ink jet ink composition comprising water, a pigment, a humectant and a hyperbranched polymer having end groups consisting essentially of hydrophilic moieties, said hyperbranched polymer having the following formula:

HB—$X_g$ wherein:
HB is a hyperbranched polymer core;
X is a hydrophilic end group; and
g is an integer of at least 2,
wherein said hyperbranched polymer is a chain polymerized residue of a monomer of the formula $M^1_n$—$R^1$—$M^2_m$ wherein (i) $R^1$ is an oligomeric or polymeric chain of a polyamide, polyester, polyether, vinylic polymer, polyimine, polysiloxane, polyurethane, polythioether, polyarylalkylene, polysilane, or polyesteramide; (ii), $M^1$ and $M^2$ are reactive groups that react independently of each other in which $M^1$ is a polymerization group and $M^2$ is a precursor of a moiety $M^{2*}$ which initiates the polymerization of $M^1$ as a result of being activated by any source; and (iii), n and m are integers of at least 1.

24. An ink jet ink composition comprising water, a pigment, a humectant and a hyperbranched polymer having end groups consisting essentially of hydrophilic moieties, said hyperbranched polymer having the following formula:

HB—$X_g$ wherein:
HB is a hyperbranched polymer core;
X is a hydrophilic end group; and
g is an integer of at least 2,
wherein said hyperbranched polymer is a condensation or addition polymerization product of a co-monomer pair of the formula $R^2$—$M^5_x$ and $R^3$—$M^6_y$, and
wherein (i) $R^2$ and $R^3$ are each independently an oligomeric or polymeric chain of a polyamide, polyester, polyether, vinylic polymer, polyimine, polysiloxane, polyurethane, polythioether, polyarylalkylene, polysilane, or polyesteramide; (ii), $M^5$ and $M^6$ are groups that undergo a condensation or addition reaction; and (iii), x is an integer of at least 2 and y an integer of at least 3.

25. An ink jet ink composition comprising water, a pigment, a humectant and a hyperbranched polymer having end groups consisting essentially of hydrophilic moieties, said hyperbranched polymer having the following formula:

HB—$X_g$ wherein:
HB is a hyperbranched polymer core;
X is a hydrophilic end group; and
g is an integer of at least 2,
wherein said hyperbranched polymer is a condensation or addition polymerization product of a monomer of the formula $M^3_s$—$R^1$—$M^4_t$, wherein said $M^3_s$—$R^1$—$M^4_t$ is 2,3-diaminoproponic acid, 2,5-diaminopentanoic acid, 1-Lysine or having the following structure:

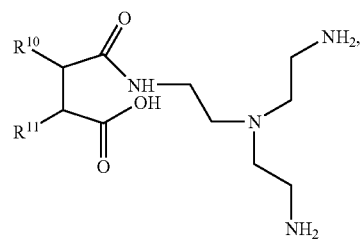

-continued

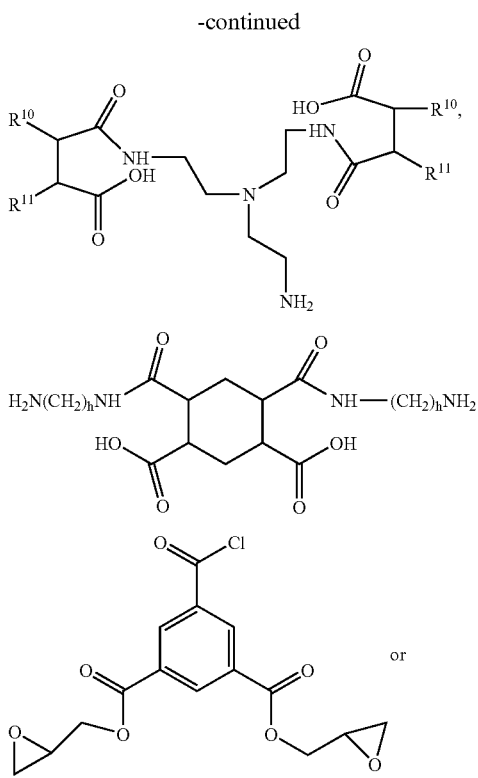

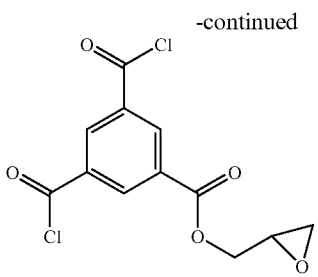

wherein $R^{10}$ and $R^{11}$ are independently H, substituted or non-substituted straight or branched alkyl, alkenyl, or aryl moiety and may be joined to form an alkylene group, or 3 to 8-membered ring; and h is an integer of at least 1.

26. An ink jet ink composition comprising water, a pigment, a humectant and a hyperbranched polymer having end groups consisting essentially of hydrophilic moieties, said hyperbranched polymer having the following formula:

$$HB-X_g$$

wherein:
HB is a hyperbranched polymer core;
X is a hydrophilic end group; and
g is an integer of at least 2,
wherein said hydrophilic end groups are cationic, and wherein said cationic groups comprise a N- or P-containing quaternized onium salt or a polymer chain containing said onium salt.

* * * * *